United States Patent
Liu et al.

(10) Patent No.: US 12,306,825 B2
(45) Date of Patent: May 20, 2025

(54) METHOD FOR KEEPING DATA CONSISTENT ACROSS DIFFERENT STORAGE SYSTEMS, COMPUTING DEVICE, AND STORAGE MEDIUM

(71) Applicant: ALIBABA CLOUD COMPUTING CO., LTD., Hangzhou (CN)

(72) Inventors: Huan Liu, Zhejiang (CN); Ruo Wang, Zhejiang (CN); Guoyun Zhu, Zhejiang (CN)

(73) Assignee: ALIBABA CLOUD COMPUTING CO., LTD., Hangzhou (CN)

( * ) Notice: Subject to any disclaimer, the term of this patent is extended or adjusted under 35 U.S.C. 154(b) by 109 days.

(21) Appl. No.: 18/246,666

(22) PCT Filed: Sep. 23, 2021

(86) PCT No.: PCT/CN2021/119791
§ 371 (c)(1),
(2) Date: Mar. 24, 2023

(87) PCT Pub. No.: WO2022/068660
PCT Pub. Date: Apr. 7, 2022

(65) Prior Publication Data
US 2023/0281187 A1  Sep. 7, 2023

(30) Foreign Application Priority Data
Sep. 29, 2020  (CN) .......................... 202011052190.3

(51) Int. Cl.
*G06F 16/23* (2019.01)
*G06F 16/2455* (2019.01)

(52) U.S. Cl.
CPC ...... *G06F 16/2365* (2019.01); *G06F 16/2455* (2019.01)

(58) Field of Classification Search
CPC ............. G06F 16/2365; G06F 16/2455; G06F 16/172; G06F 16/24552; G06F 16/27
See application file for complete search history.

(56) References Cited

U.S. PATENT DOCUMENTS 5,327,556 A * 7/1994 Mohan ................ G06F 16/1774
707/999.009
7,636,814 B1 * 12/2009 Karr ...................... G06F 3/0689
711/143

(Continued)

FOREIGN PATENT DOCUMENTS

CN     102073494 A    5/2011
CN     106557278 A    4/2017

(Continued)

OTHER PUBLICATIONS

International Search Report of PCT/CN2021/119791, Dec. 23, 2021, 2 pages.

(Continued)

*Primary Examiner* — Yuk Ting Choi
(74) *Attorney, Agent, or Firm* — Clark Hill PLC (57) ABSTRACT

A method and apparatus for keeping data consistent across different storage systems are provided. The method includes: when a first storage system is updated, processing first data to be unreadable, and generating or updating a version number corresponding to a first primary key; when the first data is unable to be read from a second storage system, acquiring a latest version number of the first primary key, and reading second data from the first storage system; comparing the acquired version number with the latest version number of the first primary key; if consistent, updating the second data into the second storage system using an atomic operation, and updating the version number corresponding to the first primary key; and if inconsistent, (Continued)

re-performing the step of acquiring the latest version number of the first primary key and reading the second data from the first storage system.

20 Claims, 6 Drawing Sheets

(56) References Cited

U.S. PATENT DOCUMENTS

| | | | | |
|---|---|---|---|---|
| 8,688,666 | B1* | 4/2014 | Briggs | G06F 16/2219 |
| | | | | 707/790 |
| 9,910,881 | B1* | 3/2018 | Brooker | H04L 41/0859 |
| | | | | 707/790 |
| 2017/0054802 | A1* | 2/2017 | Annamalai | G06F 16/248 |
| | | | | 707/790 |
| 2024/0045598 | A1* | 2/2024 | Derryberry | G06F 11/2094 |
| | | | | 707/790 |

FOREIGN PATENT DOCUMENTS

| | | |
|---|---|---|
| CN | 109862102 A | 6/2019 |
| CN | 110955719 A | 4/2020 |
| CN | 112286947 A | 1/2021 |
| JP | 2015-230689 | 12/2015 |

OTHER PUBLICATIONS

Written Opinion of the International Searching Authority for PCT/CN2021/119791, Dec. 23, 2021, 4 pages.
Office Action of CN 2020110521903, 13 pages.
Grant Notice of CN 2020110521903, 4 pages.
"Cache Aside Pattern," Jul. 11, 2018, downloaded from: https://blog.csdn.net/shenjian58/article/details/89850551, 7 pages including English-language translation.

* cited by examiner

METHOD FOR KEEPING DATA CONSISTENT ACROSS DIFFERENT STORAGE SYSTEMS, COMPUTING DEVICE, AND STORAGE MEDIUM

CROSS-REFERENCE TO RELATED APPLICATIONS

The present application is a U.S. national-phase patent application of International Patent Application No. PCT/CN2021/119,791, filed Sep. 23, 2021, which claims priority to Chinese patent application No. 202011052190.3, filed on Sep. 29, 2020 and entitled "METHOD AND APPARATUS FOR KEEPING DATA CONSISTENT ACROSS DIFFERENT STORAGE SYSTEMS", each of the aforesaid applications being incorporated by reference in its entirety.

TECHNICAL FIELD

Embodiments of the present specification relate to the field of computer technology, and in particular, to a method for keeping data consistent across different storage systems. Meanwhile, one or more embodiments of the present specification relate to an apparatus for keeping data consistent across different storage systems, a computing device, and a computer readable storage medium.

BACKGROUND

In some application scenarios, between a storage system (such as a persistent data source) and an application service, another storage system (such as a cache system) is usually required to acquire data. When a storage system is updated, data in another storage system is also required to be updated. For example, in order to keep data stored in a storage system A being the latest data of a storage system B, at present during a write operation, the storage system A is first updated, and then corresponding data in the storage system B is deleted. During a read operation, the storage system B is first read, and then if there is data in the storage system B, the data is returned; otherwise, data in the storage system A is read and then the storage system B is updated.

However, after the above operations, data inconsistence may still occur between the two storage systems.

SUMMARY

In view of this, an embodiment of the present specification provides a method for keeping data consistent across different storage systems. Meanwhile, one or more embodiments of the present specification relate to an apparatus for keeping data consistent across different storage systems, a computing device, and a computer readable storage medium, to solve the technical defects in the prior art.

According to a first aspect of an embodiment of the present specification, a method for keeping data consistent across different storage systems is provided. The method includes: in a case where a first storage system is updated with a write operation, processing, via an atomic operation, first data to be unreadable, and generating or updating, in the atomic operation, a version number corresponding to a first primary key; herein the first data is data, in a second storage system, corresponding to the first primary key for the write operation; in a case where the first data is unable to be read, with a read operation, from the second storage system, acquiring a latest version number of the first primary key, and reading second data from the first storage system; herein the second data is data, in the first storage system, corresponding to the first primary key; comparing the acquired version number with the latest version number of the first primary key; if the acquired version number is consistent with the latest version number of the first primary key, updating, via the atomic operation, the second data into the second storage system, and updating, in the atomic operation, the version number corresponding to the first primary key; and if the acquired version number is inconsistent with the latest version number of the first primary key, re-performing the step of acquiring the latest version number of the first primary key and reading the second data from the first storage system.

Optionally, the first storage system is a persistent data source and the second storage system is a cache system.

Optionally, the method further includes: if the latest version number of the first primary key is unable to be acquired, generating, via the atomic operation, an initial value of the version number corresponding to the first primary key.

Optionally, in the case where the first data is unable to be read, with the read operation, from the second storage system, acquiring the latest version number of the first primary key, includes: sending, to the second storage system, a request for reading, with the read operation, data; receiving a message, indicating that the data is unreadable, fed back by the second storage system in response to the request; herein the message carries the latest version number of the first primary key; and acquiring the latest version number of the first primary key according to the message.

Optionally, the second storage system provides a hidden acquisition interface, and the hidden acquisition interface is configured for acquiring the latest version number of the first primary key. In the case where the first data is unable to be read, with the read operation, from the second storage system, acquiring the latest version number of the first primary key, includes: sending, to the second storage system, a request for reading, with the read operation, data; receiving a message, indicating that the data is unreadable, fed back by the second storage system in response to the request; and acquiring, through the hidden acquisition interface of the second storage system, the latest version number of the first primary key according to the message.

Optionally, the second storage system provides a hidden interface, and the hidden interface is configured for marking, via the atomic operation, data as hidden to make the data unreadable, and generating or updating, in the atomic operation, a version number corresponding to a primary key for the data. In the case where the first storage system is updated with the write operation, processing, via the atomic operation, the first data to be unreadable, and generating or updating, in the atomic operation, the version number corresponding to the first primary key, includes: in the case where the first storage system is updated with the write operation, marking, via the atomic operation, the first data as hidden to make the first data unreadable by calling the hidden interface, and generating or updating, in the atomic operation, the version number corresponding to the first primary key.

Optionally, in the case where the first storage system is updated with the write operation, processing, via the atomic operation, the first data to be unreadable, includes: in the case where the first storage system is updated with the write operation, deleting, via the atomic operation, the first data, in the second storage system, corresponding to the first primary key for the write operation.

According to a second aspect of an embodiment of the present specification, an apparatus for keeping data consistent across different storage systems is provided. The apparatus includes: a write module, configured for, in a case where a first storage system is updated with a write operation, processing, via an atomic operation, first data to be unreadable, and generating or updating, in the atomic operation, a version number corresponding to a first primary key; herein the first data is data, in a second storage system, corresponding to the first primary key for the write operation; a read module, configured for, in a case where the first data is unable to be read, with a read operation, from the second storage system, acquiring a latest version number of the first primary key, and reading second data from the first storage system; herein the second data is data, in the first storage system, corresponding to the first primary key; a comparison module, configured for comparing the acquired version number with the latest version number of the first primary key, and if the acquired version number is inconsistent with the latest version number of the first primary key, triggering the read module to re-perform the step of acquiring the latest version number of the first primary key and reading the second data from the first storage system; and a data update module, configured for, if the comparison module determines that the acquired version number is consistent with the latest version number of the first primary key, updating, via the atomic operation, the second data into the second storage system, and updating, in the atomic operation, the version number corresponding to the first primary key.

According to a third aspect of an embodiment of the present specification, a computing device is provided. The computing device includes a memory and a processor; herein the memory is configured for storing computer executable instructions, and the processor is configured for executing the computer executable instructions to perform operations of: in a case where a first storage system is updated with a write operation, processing, via an atomic operation, first data to be unreadable, and generating or updating, in the atomic operation, a version number corresponding to a first primary key; herein the first data is data, in a second storage system, corresponding to the first primary key for the write operation; in a case where the first data is unable to be read, with a read operation, from the second storage system, acquiring a latest version number of the first primary key, and reading second data from the first storage system; herein the second data is data, in the first storage system, corresponding to the first primary key; comparing the acquired version number with the latest version number of the first primary key; if the acquired version number is consistent with the latest version number of the first primary key, updating, via the atomic operation, the second data into the second storage system, and updating, in the atomic operation, the version number corresponding to the first primary key; and if the acquired version number is inconsistent with the latest version number of the first primary key, re-performing the step of acquiring the latest version number of the first primary key and reading the second data from the first storage system.

According to a fourth aspect of an embodiment of the present specification, a computer readable storage medium is provided. The computer readable storage medium stores computer executable instructions, herein the computer executable instructions, when executed by a processor, implements steps of any one method for keeping data consistent across different storage systems.

An embodiment of the present specification provides a method for keeping data consistent across different storage systems. In the method, in the case where the first storage system is updated with a write operation, the first data is processed to be unreadable via an atomic operation and the version number corresponding to the first primary key is generated or updated, and the first data is data, in the second storage system, corresponding to the first primary key for the write operation. In this way, the update of the data and the update of the version number are taken as a whole via the atomic operation, and pre-occupation is achieved in the second storage system, which efficiently avoids the inconsistency caused by the concurrent updates. In a case where the first data needs to be read and the first data cannot be read from the second storage system, the latest version number of the first primary key is acquired, the second data is read from the first storage system, and the acquired version number is compared with the latest version number of the first primary key. If the acquired version number is consistent with the latest version number of the first primary key, it indicates that after reading, through the read operation, the second data from the first storage system, the read data has not been updated. Therefore, the read second data may be updated into the second storage system via the atomic operation, and the version number corresponding to the first primary key is updated in the atomic operation, which can efficiently avoid the inconsistency caused by concurrent read operations. If the acquired version number is inconsistent with the latest version number of the first primary key, it indicates that after reading, through the read operation, the second data from the first storage system, the second data in the first storage system has been updated, and the corresponding version number needs to be reacquired to perform comparison, so as to update the latest second data into the second storage system, thereby keeping data consistent between the first storage system and the second storage system. It can be seen that the method provided by the embodiment of the present specification takes the update of the data and the update of the version number as a whole as an atomic operation, to implement, through the pre-occupation in the second storage system, the data consistency between the first storage system and the second storage system.

DETAILED DESCRIPTION

Many specific details are set forth in the following description to facilitate comprehensive understanding of the present specification. However, embodiments of the present specification can be implemented in many other ways different from specific details described herein. The skilled in the art may make similar extensions without departing from the meaning of the present specification, and thus the present specification is not limited by the specific implementations disclosed below.

Terms used in one or more embodiments in the present specification are only for the purpose of describing specific embodiments, instead of limiting the one or more embodiments in the present specification. Expressions in singular form, such as "a," "the," and "this," as used in one or more embodiments of the present specification and attached claims are also aimed to include plural, unless the context clearly indicates other meanings. It should also be appreciated that the term "and/or" used in one or more embodiments of the present specification means any or all possible combinations of one or more associated items listed.

It should be appreciated that although terms "first," "second," or the like may be used in one or more embodiments of the present specification to describe various kinds of information, such information should not be limited by these terms. These terms are only used to distinguish the same type of information from one another. For example, "the first" may also be referred to as "the second," and similarly, "the second" may also be referred to as "the first," without departing from the scope of one or more embodiments of the present specification. Depending on the context, the word "if" as used herein may be interpreted as "at the time of," or "when," or "in response to determining."

First, nominal terms involved in one or more embodiments of the present specification are explained.

Primary key: is representation of data stored in a storage system, and used to acquire corresponding data (value).

Version number: is version information of data, and may be updated in a way such as atomically auto-increment when the data is modified in a storage system.

Atomic operation: refers to an operation that will not be interrupted by a thread scheduling mechanism. Once an atomic operation starts, the atomic operation will run until the end of the atomic operation without switching to another thread during the course. For example, in one or more embodiments of the present specification, atomically auto-increment of version number and data update inside a cache are a complete whole, which are updated as a whole within an atomic operation, without being interrupted by the thread scheduling mechanism.

In the present specification, a method for keeping data consistent across different storage systems is provided. Meanwhile, the present specification involves an apparatus for keeping data consistent across different storage systems, a computing device, and a computer readable storage medium. These will be illustrated in detail one by one in the following embodiments.

Figure 1:
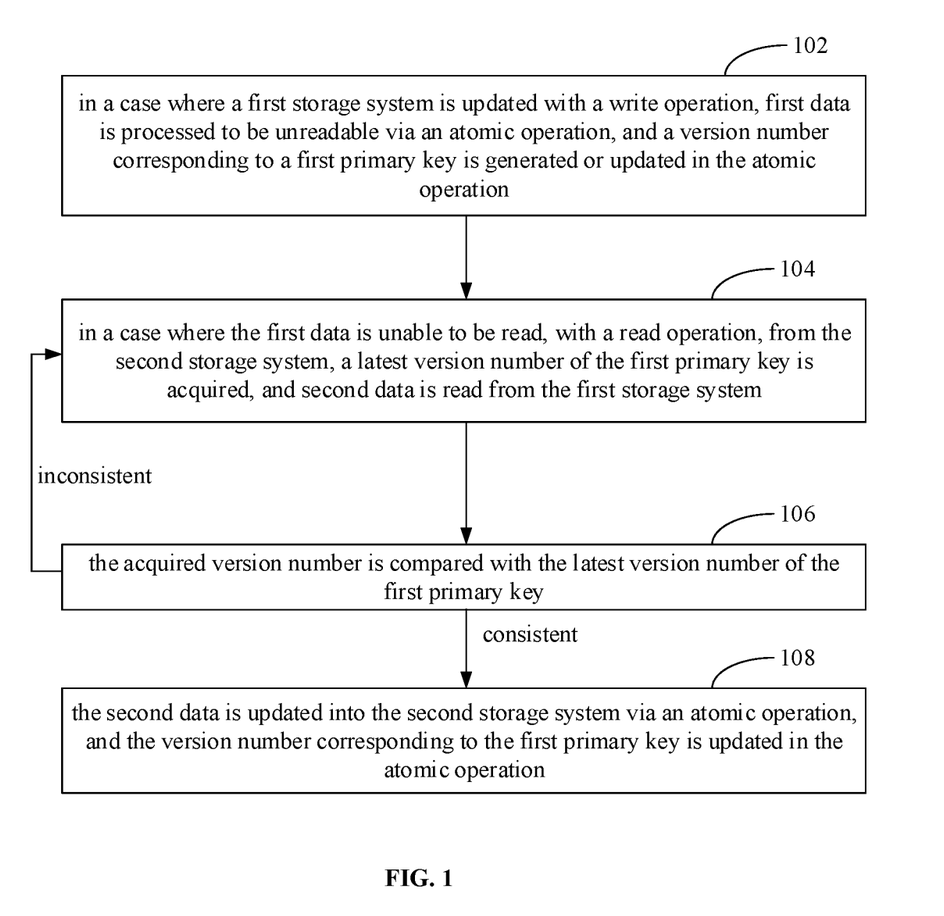
FIG. 1 is a flow chart of a method for keeping data consistent across different storage systems provided by an embodiment of the present specification.

FIG. 1 shows a flow chart of a method for keeping data consistent across different storage systems provided according to an embodiment of the present specification, including steps 102 to 108.

At the step 102: in a case where a first storage system is updated with a write operation, first data is processed to be unreadable via an atomic operation, and a version number corresponding to a first primary key is generated or updated in the atomic operation; herein the first data is data, in a second storage system, corresponding to the first primary key for the write operation.

At the step 104: in a case where the first data is unable to be read, with a read operation, from the second storage system, a latest version number of the first primary key is acquired, and second data is read from the first storage system; herein the second data is data, in the first storage system, corresponding to the first primary key.

At the step 106: the acquired version number is compared with the latest version number of the first primary key.

If the acquired version number is inconsistent with the latest version number of the first primary key, the step 104, that is, the step of acquiring the latest version number of the first primary key and reading the second data from the first storage system, is re-performed.

At the step 108: if the acquired version number is consistent with the latest version number of the first primary key, the second data is updated into the second storage system via an atomic operation and the version number corresponding to the first primary key is updated in the atomic operation.

It can be seen that, in the method, in the case where the first storage system is updated with a write operation, the first data is processed to be unreadable via an atomic operation and the version number corresponding to the first primary key is generated or updated, and the first data is data, in the second storage system, corresponding to the first primary key for the write operation. In this way, the update of the data and the update of the version number are taken as a whole via the atomic operation, and pre-occupation is achieved in the second storage system, which efficiently avoids the inconsistency caused by the concurrent updates. In a case where the first data needs to be read and the first data cannot be read from the second storage system, the latest version number of the first primary key is acquired, the second data is read from the first storage system, and the acquired version number is compared with the latest version number of the first primary key. If the acquired version number is consistent with the latest version number of the first primary key, it indicates that after reading, through the read operation, the second data from the first storage system, the read data has not been updated. Therefore, the read second data may be updated into the second storage system via the atomic operation, and the version number corresponding to the first primary key is updated in the atomic operation, which can efficiently avoid the inconsistency caused by concurrent read operations. If the acquired version number is inconsistent with the latest version number of the first primary key, it indicates that after reading, through the read operation, the second data from the first storage system, the second data in the first storage system has been updated, and the corresponding version number needs to be reacquired to perform comparison, so as to update the latest second data into the second storage system, thereby keeping data consistent between the first storage system and the second storage system. It can be seen that the method provided by the embodiment of the present specification takes the update of the data and the update of the version number as a whole as an atomic operation, to implement, through the pre-occupation in the second storage system, the data consistency between the first storage system and the second storage system.

It can be understood that in actual application scenarios, there may be multiple data update operations or read operations, for the same one primary key, performed in parallel, or these operations may be interlacedly performed in any order. Since the method provided by the embodiment of the present specification takes the update of data and the update of the version number as a whole to be performed via an atomic operation, the data consistence between the first storage system and the second storage system can be ensured.

For example, the method provided by the embodiment of the present specification may be applied to an application scenario in which data is kept to be consistent between a persistent data source (such as a database) and a cache. In this application scenario, the first storage system may be the persistent data source, and the second storage system may be the cache system. For example, the method provided by the embodiment of the present specification may be applied inside a cache system. Therefore, inside the cache system, data update and version update become a complete whole, and the data and version are updated together, in an atomic way, in an atomic operation. According to the method provided by the embodiment of the present specification, by taking the update of data and the update of the version number as a whole as an atomic operation, to perform pre-occupation in the cache system, data consistency between the persistent data source and the cache system is implemented.

To avoid a case where the version number corresponding to the primary key cannot be acquired from the second storage system, in one or more embodiments of the present specification, the method further includes: if the latest version number of the first primary key is unable to be acquired, generating, via the atomic operation, an initial value of the version number corresponding to the first primary key. In this embodiment, the read flow is further improved by assigning an initial value for an unacquirable version number, which can efficiently ensure that: the purpose of keeping data consistent across different storage systems can be achieved with the initial version number, in a case where the data corresponding to the primary key has not been updated.

In the method provided by the embodiment of the present specification, the specific implementations for acquiring the latest version number of the primary key are not limited.

For example, in an embodiment of the present specification, a message fed back by the second storage system may carry a version number. Specifically, for example, in the case where the first data is unable to be read, with the read operation, from the second storage system, acquiring the latest version number of the first primary key, includes: sending, to the second storage system, a request for reading, with the read operation, data; receiving a message, indicating that the data is unreadable, fed back by the second storage system in response to the request; herein the message carries the latest version number of the first primary key; and acquiring the latest version number of the first primary key according to the message. In this embodiment, when the data is unreadable, the version number carried by the message returned by the second storage system is directly extracted from the message, and thus the flow is clear and the amount of data transmitted is small.

For another example, in another embodiment of the present specification, the second storage system provides a hidden acquisition interface, and the hidden acquisition interface is configured for acquiring the latest version number of the first primary key. In the case where the first data is unable to be read, with the read operation, from the second storage system, acquiring the latest version number of the first primary key, includes: sending, to the second storage system, a request for reading, with the read operation, data; receiving a message, indicating that the data is unreadable, fed back by the second storage system in response to the request; and acquiring, through the hidden acquisition interface of the second storage system, the latest version number of the first primary key according to the message. In this embodiment, when the data is unreadable, the version number is acquired correspondingly through the hidden acquisition interface according to the message returned by the second storage system, and the second storage system does not need to return additional information or attributes, which may reduce unnecessary data transmission.

It should be noted that, in the method provided by the embodiment of the present specification, the specific implementations for processing data to be unreadable are not limited. For example, the data may be marked as hidden. For another example, the data may be deleted to make the data unreadable.

Specifically, for example, in one or more embodiments of the present specification, the second storage system provides a hidden interface, and the hidden interface is configured for marking, via the atomic operation, data as hidden to make the data unreadable, and generating or updating, in the atomic operation, a version number corresponding to a primary key for the data. In the case where the first storage system is updated with the write operation, processing, via the atomic operation, the first data to be unreadable, and generating or updating, in the atomic operation, the version number corresponding to the first primary key, includes: in the case where the first storage system is updated with the write operation, marking, via the atomic operation, the first data, in the second storage system, corresponding to the first primary key as hidden to make the first data unreadable by calling the hidden interface, and generating or updating, in the atomic operation, the version number corresponding to the first primary key. In this embodiment, the existence of the primary key in the second storage system may be maintained by marking the data as hidden, which facilitates directly setting a version number corresponding to the primary key, and improves the processing efficiency of the write logic.

For another example, in one or more embodiments of the present specification, in the case where the first storage system is updated with the write operation, processing, via the atomic operation, the first data to be unreadable, includes: in the case where the first storage system is updated with the write operation, deleting, via the atomic operation, the first data, in the second storage system, corresponding to the first primary key for the write operation. In this embodiment, in a case where the first data, in the second storage system, corresponding to the primary key is deleted, the primary key may be retained, and the value corresponding to the primary key is set to null, which facilitates setting a corresponding version number, and improves the processing efficiency of the write logic.

The method for keeping data consistent across different storage systems provided by the embodiment of the present specification is further illustrated below in combination with FIG. 2 and FIG. 3, with an example of applying the method for keeping data consistent across different storage systems to keep the consistency between a persistent data source and a cache. It should be noted that in this embodiment, a version number management mechanism is added to the cache system, and the cache system provides external data write and read interfaces, and provides a set of protocols supporting special attributes of marked data. That is, the marked data exists, but cannot be read by an ordinary data access interface, and can only be read by a special interface. In addition, the protocols support atomic increment of the version number for the data, that is, the protocols may support the consistency update between the persistent data and the cache. For example, the cache system provides the protocols to support the existence of the marked data, however, the marked data cannot be read by an ordinary data access interface, such as a "get" interface, but can be read by a hidden acquisition interface, such as a "getHidden" interface, described in the embodiment of the present specification. In addition, the protocols support the atomic increment of the version number for the data. Therefore, the cache system of this embodiment additionally provides a set of interfaces, such as "hide/getHidden", to support for hiding and marking the data.

Figure 2:
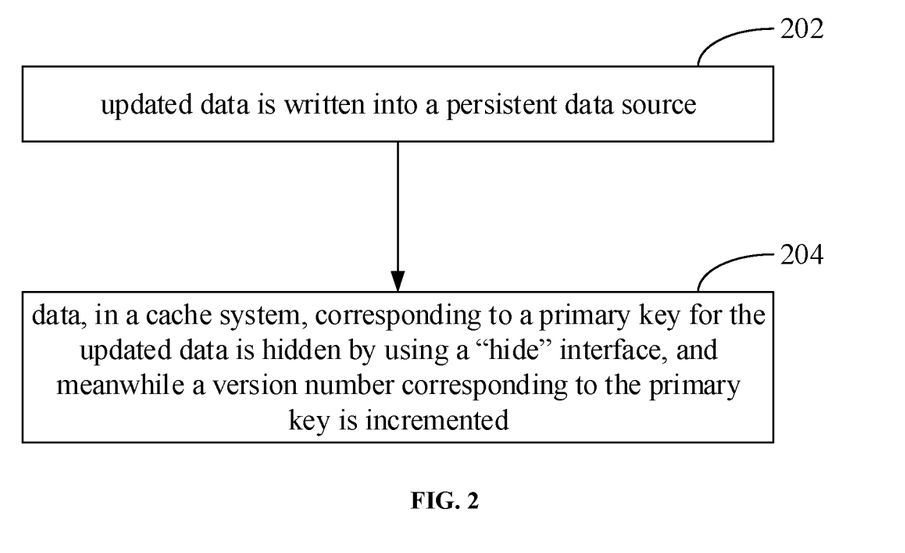
FIG. 2 is a flow chart of a writing process of a method for keeping data consistent across different storage systems provided by an embodiment of the present specification.

Specifically, FIG. 2 shows a flow chart of a writing process of a method for keeping data consistent across different storage systems provided by an embodiment of the present specification, specifically including steps 202 to 204.

At the step 202: updated data is written into a persistent data source.

At the step 204: data, in a cache system, corresponding to a primary key for the updated data is hidden by using a "hide" interface, and meanwhile a version number corresponding to the primary key is incremented.

"Hide": is a hiding operation of the cache system; that is, the data is hidden via an atomic operation and a version number corresponding to a primary key for the data is incremented, such that the data is not acquired by an ordinary "get" read request, but may be acquired by a special "getHidden" request.

Version number: the version number corresponding to the primary key is incremented when a write operation is performed for the data.

Figure 3:
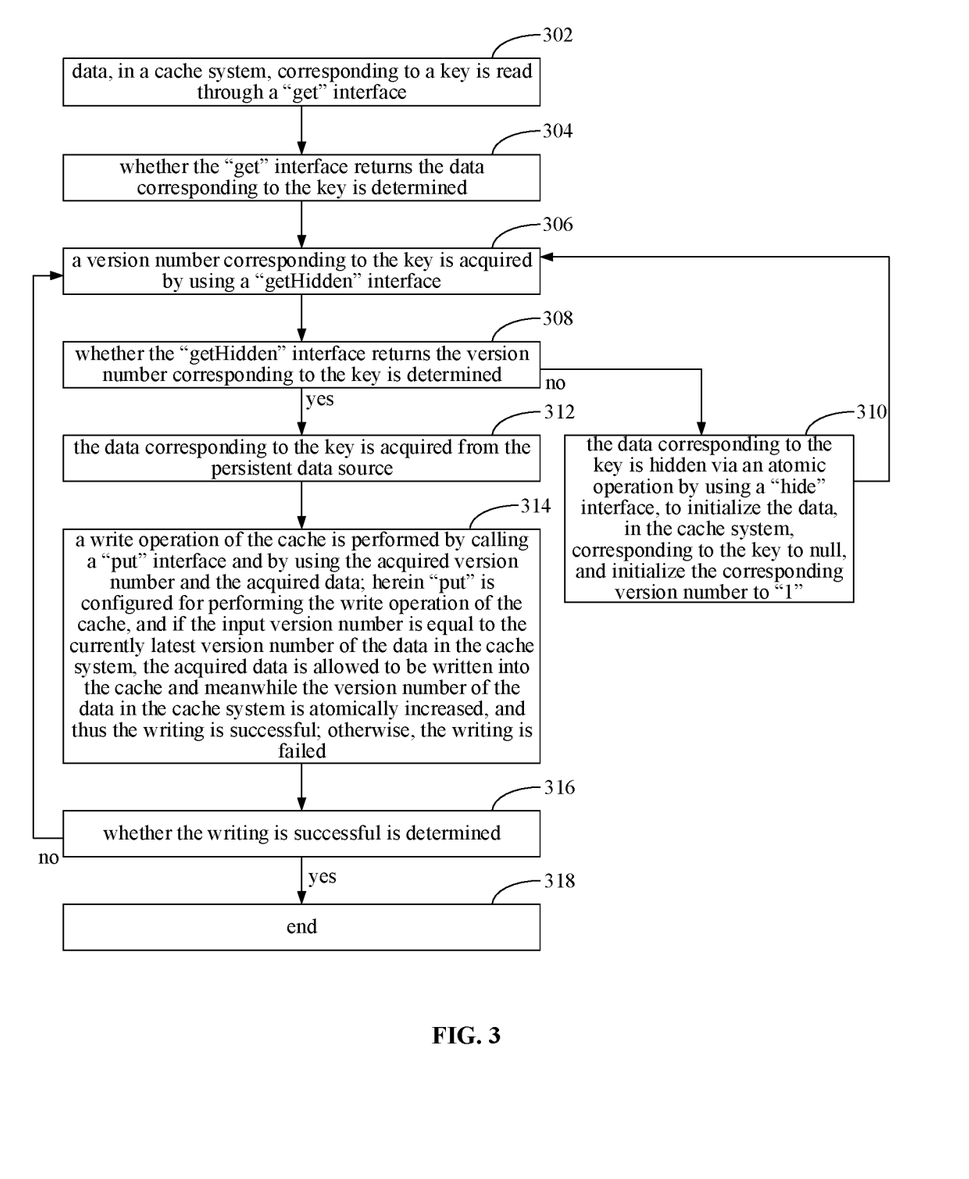
FIG. 3 is a flow chart of a reading process of a method for keeping data consistent across different storage systems provided by an embodiment of the present specification.

FIG. 3 shows a flow chart of a reading process of a method for keeping data consistent across different storage systems provided by an embodiment of the present specification, specifically including steps 302 to 318.

At the step 302: data, in a cache system, corresponding to a key is read through a "get" interface.

"Get": is an ordinary read operation of the cache system, and is configured for acquiring data.

At the step 304: whether the "get" interface returns the data corresponding to the key is determined.

If the "get" interface does not return the data corresponding to the key, the step 306 is performed.

At the step 306: a version number corresponding to the key is acquired by using a "getHidden" interface.

"GetHidden": is a special read operation of the cache system, and is configured for acquiring version information of hidden data.

At the step 308: whether the "getHidden" interface returns the version number corresponding to the key is determined.

At the step 310: if the "getHidden" interface does not return the version number corresponding to the key, the data corresponding to the key is hidden via an atomic operation by using a "hide" interface, to initialize the data, in the cache system, corresponding to the key to null, and initialize the corresponding version number to "1." The step 306 is re-performed.

At the step 312: if the "getHidden" interface returns the version number corresponding to the key, the data corresponding to the key is acquired from the persistent data source.

At the step 314: a write operation of the cache is performed by calling a "put" interface and by using the version number acquired in the step 306 and the acquired data; herein "put" is configured for performing the write operation of the cache, and if the input version number is equal to the currently latest version number of the data in the cache system, the acquired data is allowed to be written into the cache and meanwhile the version number of the data in the cache system is atomically increased, and thus the writing is successful; otherwise, the writing is failed.

At the step 316: whether the writing is successful is determined.

If the writing is not successful, the step 306 is returned to. If the writing is successful, the step 318 is performed.

At the step 318: the flow ends.

It can be seen that the "put" interface is called in the step 314, and the "put" operation will compare the version number acquired in the step 306 with the latest version number of the key in the cache system. If the version number acquired in the step 306 is inconsistent with the latest version number of the key in the cache system, the writing is failed and the step 306 is returned to. If the version number acquired in the step 306 is consistent with the latest version number of the key in the cache system, the writing is successful and the step 318 is performed to end the flow.

Figure 4:
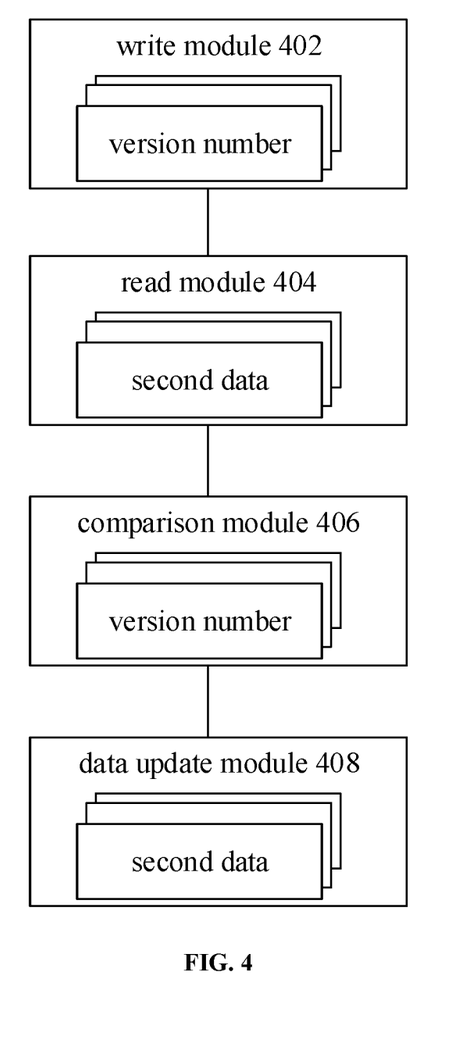
FIG. 4 is a schematic structural diagram of an apparatus for keeping data consistent across different storage systems provided by an embodiment of the present specification.

Corresponding to the above method embodiments, the present specification further provides embodiments of an apparatus for keeping data consistent across different storage systems. FIG. 4 shows a schematic structural diagram of an apparatus for keeping data consistent across different storage systems provided by an embodiment of the present specification. As shown in FIG. 4, the apparatus includes a write module 402, a read module 404, a comparison module 406, and a data update module 408.

The write module 402 may be configured for, in a case where a first storage system is updated with a write operation, processing, via an atomic operation, first data to be unreadable, and generating or updating, in the atomic operation, a version number corresponding to a first primary key; herein the first data is data, in a second storage system, corresponding to the first primary key for the write operation.

The read module 404 may be configured for, in a case where the first data is unable to be read, with a read operation, from the second storage system, acquiring a latest version number of the first primary key, and reading second data from the first storage system; herein the second data is data, in the first storage system, corresponding to the first primary key.

The comparison module 406 may be configured for comparing the acquired version number with the latest version number of the first primary key, and if the acquired version number is inconsistent with the latest version number of the first primary key, triggering the read module 404 to re-perform the step of acquiring the latest version number of the first primary key and reading the second data from the first storage system.

The data update module 408 may be configured for, if the comparison module 406 determines that the acquired version number is consistent with the latest version number of the first primary key, updating, via the atomic operation, the second data into the second storage system, and updating, in the atomic operation, the version number corresponding to the first primary key.

It can be seen that, as for the apparatus, in the case where the first storage system is updated with a write operation, the first data is processed to be unreadable via an atomic operation and the version number corresponding to the first primary key is generated or updated, and the first data is data, in the second storage system, corresponding to the first primary key for the write operation. In this way, the update of the data and the update of the version number are taken as a whole via the atomic operation, and pre-occupation is achieved in the second storage system, which efficiently avoids the inconsistency caused by the concurrent updates.

In a case where the first data needs to be read and the first data cannot be read from the second storage system, the latest version number of the first primary key is acquired, the second data is read from the first storage system, and the acquired version number is compared with the latest version number of the first primary key. If the acquired version number is consistent with the latest version number of the first primary key, it indicates that after reading, through the read operation, the second data from the first storage system, the read data has not been updated. Therefore, the read second data may be updated into the second storage system via the atomic operation, and the version number corresponding to the first primary key is updated in the atomic operation, which can efficiently avoid the inconsistency caused by concurrent read operations. If the acquired version number is inconsistent with the latest version number of the first primary key, it indicates that after reading, through the read operation, the second data from the first storage system, the second data in the first storage system has been updated, and the corresponding version number needs to be reacquired to perform comparison, so as to update the latest second data into the second storage system, thereby keeping data consistent between the first storage system and the second storage system. It can be seen that the apparatus provided by the embodiment of the present specification takes the update of the data and the update of the version number as a whole as an atomic operation, to implement, through the pre-occupation in the second storage system, the data consistency between the first storage system and the second storage system.

Figure 5:
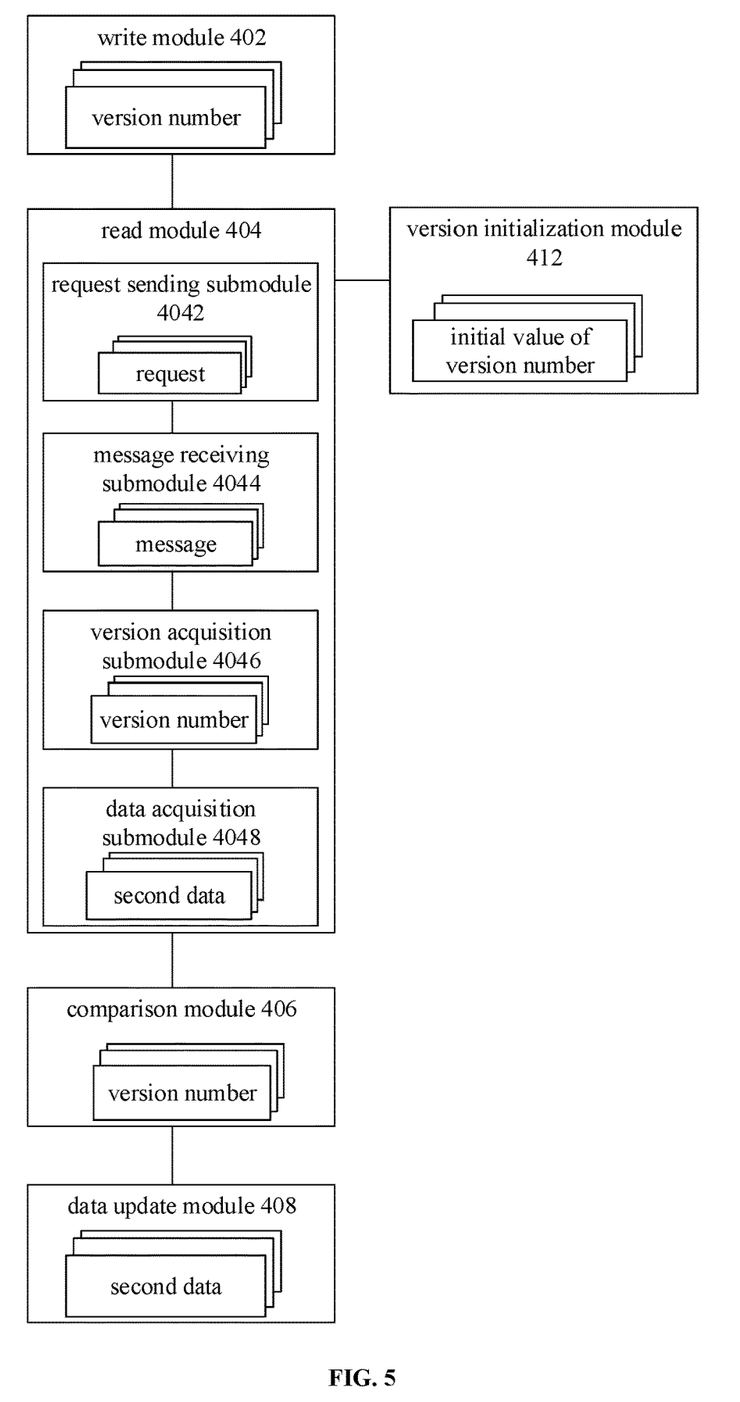
FIG. 5 is a schematic structural diagram of an apparatus for keeping data consistent across different storage systems provided by another embodiment of the present specification.

FIG. 5 shows a schematic structural diagram of an apparatus for keeping data consistent across different storage systems provided by another embodiment of the present specification. As shown in FIG. 5, the apparatus further includes a version initialization module 412, which may be configured for generating, via the atomic operation, an initial value of the version number corresponding to the first primary key, if the read module 404 fails to acquire the latest version number of the first primary key. In this embodiment, the read flow is further improved by assigning an initial value for an unacquirable version number, which can efficiently ensure that: the purpose of keeping data consistent across different storage systems can be achieved with the initial version number, in a case where the data corresponding to the primary key has not been updated.

In one or more embodiments of the present specification, as shown in FIG. 5, the read module 404 may include: a request sending submodule 4042, a message receiving submodule 4044, a version acquisition submodule 4046, and a data acquisition submodule 4048.

The request sending submodule 4042 may be configured for sending, to the second storage system, a request for reading, with the read operation, data.

The message receiving submodule 4044 may be configured for receiving a message, indicating that the data is unreadable, fed back by the second storage system in response to the request; herein the message carries the latest version number of the first primary key.

The version acquisition submodule 4046 may be configured for acquiring the latest version number of the first primary key according to the message.

The data acquisition submodule 4048 may be configured for reading, from the first storage system, the data corresponding to the first primary key.

In this embodiment, when the data is unable to be read from the second storage system, the version number carried by the message returned by the second storage system is directly extracted from the message, and thus the flow is clear and the amount of data transmitted is small.

In one or more embodiments of the present specification, the second storage system provides a hidden acquisition interface, and the hidden acquisition interface is configured for acquiring the latest version number of the first primary key.

The request sending submodule 4042 may be configured for sending, to the second storage system, a request for reading, with the read operation, data.

The message receiving submodule 4044 may be configured for receiving a message, indicating that the data is unreadable, fed back by the second storage system in response to the request.

The version acquisition submodule 4046 may be configured for acquiring, through the hidden acquisition interface of the second storage system, the latest version number of the first primary key according to the message.

In this embodiment, when the data is unreadable, the version number is acquired correspondingly through the hidden acquisition interface according to the message returned by the second storage system, and the second storage system does not need to return additional information or attributes, which may reduce unnecessary data transmission.

In one or more embodiments of the present specification, the second storage system provides a hidden interface, and the hidden interface is configured for marking, via the atomic operation, data as hidden to make the data unreadable, and generating or updating, in the atomic operation, a version number corresponding to a primary key for the data. The write module 402 may be configured for, in the case where the first storage system is updated with the write operation, marking, via the atomic operation, the first data as hidden to make the first data unreadable by calling the hidden interface, and generating or updating, in the atomic operation, the version number corresponding to the first primary key. In this embodiment, the existence of the primary key in the second storage system may be maintained by marking the data as hidden, which facilitates directly setting a version number corresponding to the primary key, and improves the processing efficiency of the write logic.

In one or more embodiments of the present specification, the write module 402 may be configured for in the case where the first storage system is updated with the write operation, deleting, via the atomic operation, the first data, in the second storage system, corresponding to the first primary key for the write operation. In this embodiment, in a case where the first data, in the second storage system, corresponding to the primary key is deleted, the primary key may be retained, and the value corresponding to the primary key is set to null, which facilitates setting a corresponding version number, and improves the processing efficiency of the write logic.

The above is a schematic solution of an apparatus for keeping data consistent across different storage systems of this embodiment. It should be noted that, the technical solution of the apparatus for keeping data consistent across different storage systems has the same conception as the technical solution of the above method for keeping data consistent across different storage systems, and the detailed contents, that are not described in detail, of the technical solution of the apparatus for keeping data consistent across different storage systems may refer to the description of the technical solution of the above method for keeping data consistent across different storage systems.

Figure 6:
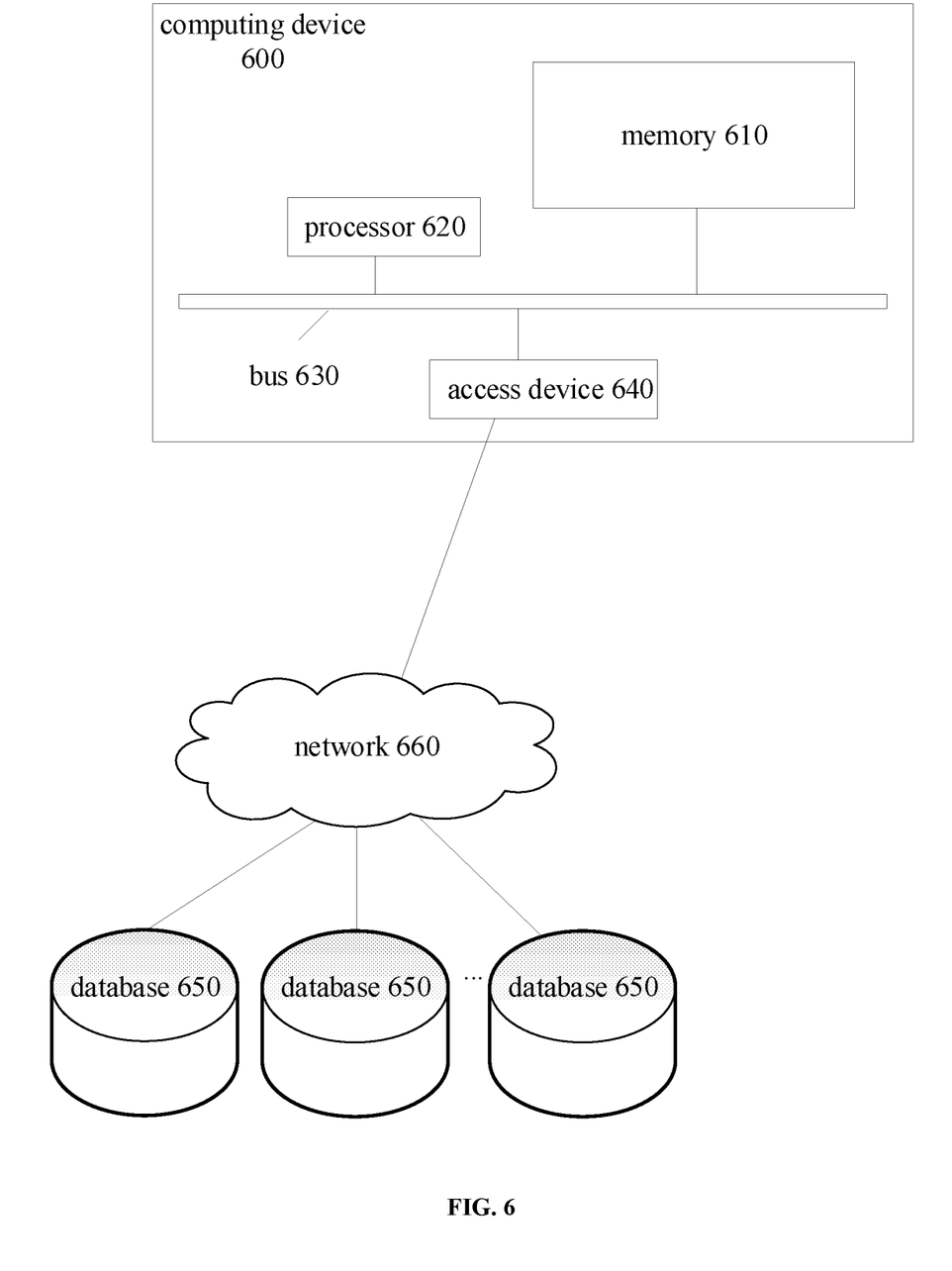
FIG. 6 is a structural block diagram of a computing device provided by an embodiment of the present specification.

FIG. 6 shows a structural block diagram of a computing device 600 provided according to an embodiment of the present specification. Components of the computing device 600 includes, but not limited to, a memory 610 and a processor 620. The processor 620 is connected with the memory 610 though a bus 630, and a database 650 is used for storing data.

The computing device 600 further includes an access device 640. The access device 640 enables the computing device 600 to communicate via one or more networks 660. Examples of these networks include the public switched telephone network (PSTN), local area network (LAN), wide area network (WAN), personal area network (PAN), or a combination of communication networks, such as the Internet. The access device 640 may include one or more of any type of wired or wireless network interfaces (for example, a network interface card (NIC)), such as an IEEE 802.11 wireless local area network (WLAN) wireless interface, a world interoperability for microwave access (Wi-MAX) interface, an Ethernet interface, a universal serial bus (USB) interface, a cellular network interface, a Bluetooth interface, a near field communication (NFC) interface, etc.

In an embodiment of the present specification, the above components of the computing device 600 and other components not shown in FIG. 6 may also be connected with each other, such as through the bus. It should be appreciated that the structural block diagram of the computing device shown in FIG. 6 is only for illustrative purposes, rather than limiting the scope of the present specification. Other components may be added or replaced by the skilled in the art as needed.

The computing device 600 may be any type of stationary or mobile computing devices, including mobile computers or mobile computing devices (such as a tablet computer, a personal digital assistant, a laptop computer, a notebook computer, a netbook, etc.), mobile phones (such as a smart phone), wearable computing devices (such as a smart watch, a smart glasses, etc.), or other types of mobile devices, or stationary computing devices such as a desktop computer or PC. The computing device 600 may also be a mobile or stationary server.

Herein, the processor 620 is configured for executing computer executable instructions to perform operations of: in a case where a first storage system is updated with a write operation, processing, via an atomic operation, first data to be unreadable, and generating or updating, in the atomic operation, a version number corresponding to a first primary key; herein the first data is data, in a second storage system, corresponding to the first primary key for the write operation; in a case where the first data is unable to be read, with a read operation, from the second storage system, acquiring a latest version number of the first primary key, and reading second data from the first storage system; herein the second data is data, in the first storage system, corresponding to the first primary key; comparing the acquired version number with the latest version number of the first primary key; if the acquired version number is consistent with the latest version number of the first primary key, updating, via the atomic operation, the second data into the second storage system, and updating, in the atomic operation, the version number corresponding to the first primary key; and if the acquired version number is inconsistent with the latest version number of the first primary key, re-performing the step of acquiring the latest version number of the first primary key and reading the second data from the first storage system.

The above is a schematic solution of a computing device of this embodiment. It should be noted that the technical solution of the computing device has the same conception as the technical solution of the above method for keeping data consistent across different storage systems, and the detailed contents, that are not described in detail, of the technical solution of the computing device may refer to the description of in the technical solution of the above method for keeping data consistent across different storage systems.

An embodiment of the present specification further provides a computer readable storage medium. The computer readable storage medium stores computer instructions, and the computer instructions, when executed by a processor, are configured for performing operations of: in a case where a first storage system is updated with a write operation, processing, via an atomic operation, first data to be unreadable, and generating or updating, in the atomic operation, a version number corresponding to a first primary key; herein the first data is data, in a second storage system, corresponding to the first primary key for the write operation; in a case where the first data is unable to be read, with a read operation, from the second storage system, acquiring a latest version number of the first primary key, and reading second data from the first storage system; herein the second data is data, in the first storage system, corresponding to the first primary key; comparing the acquired version number with the latest version number of the first primary key; if the acquired version number is consistent with the latest version number of the first primary key, updating, via the atomic operation, the second data into the second storage system, and updating, in the atomic operation, the version number corresponding to the first primary key; and if the acquired version number is inconsistent with the latest version number of the first primary key, re-performing the step of acquiring the latest version number of the first primary key and reading the second data from the first storage system.

The above is a schematic solution of a computer readable storage medium of this embodiment. It should be noted that the technical solution of the storage medium has the same conception as the technical solution of the above method for keeping data consistent across different storage systems, and the detailed contents, that are not described in detail, of the technical solution of the storage medium may refer to the description of the technical solution of the above method for keeping data consistent across different storage systems.

The specific embodiments in the present specification are described above. Other embodiments are within the scope of the attached claims. In some cases, actions or steps recited in the claims may be performed in an order that is different from the order described in embodiments, and a desired result may still be achieved. In addition, processes depicted in the drawings are not necessarily required, in the continuous order or in the specific order as shown, to achieve a desired result. In certain implementations, multi-task processing and parallel processing are also be possible or the multi-task processing and parallel processing may be advantageous.

The computer instructions include computer program codes. The computer program codes may be in a form of source code, object code, executable file, or certain intermediate forms, etc. The computer readable medium may include: any entity or apparatus capable of carrying the computer program codes, a recording medium, a UT disk, a mobile hard disk, a magnetic disk, an optical disk, a computer memory, a Read-Only Memory (ROM), a Random Access Memory (RAM), an electrical carrier signal, a telecommunication signal, and a software distribution medium, etc. It should be noted that the contents are contained in the computer readable medium may be appropriately increased or decreased according to the requirements of legislation and patent practices in the jurisdiction. For example, in certain jurisdictions, the computer readable medium does not include the electrical carrier signal and telecommunication signal according to the legislation and patent practices.

It should be noted that the above various method embodiments are described as a combination of a series of actions for the sake of simplicity, but the skilled in the art should know that the embodiments of the present specification are not limited to the order of actions as described, since certain steps may be performed in another order or simultaneously according to the embodiments of the present specification. Second, the skilled in the art should also know that the embodiments described in the specification are all preferable embodiments, and the actions and modules involved are not necessarily necessary for the embodiments of the present specification.

In the above embodiments, the description of each embodiment has its own focus, and for a part that is not described in detail in a certain embodiment, reference may be made to relevant description in other embodiments.

The preferable embodiments of the present specification disclosed above are only for helping to explain the present specification. Optional embodiments do not exhaustively set forth all the details, and also do not limit that the invention is only the described specific implementations. Obviously, many modifications and changes may be made according to the contents of the embodiments of the present specification. These embodiments are selected and described in detail in the present specification to better explain the principles and practical applications of the embodiments of the present specification, so that the skilled in the art can well understand and use the present specification. The present specification is only limited by the claims and the entire scope and equivalents of the claims.

What is claimed is:

1. A method for keeping data consistent across different storage systems, implemented by one or more computing devices, wherein the method comprises a writing process and a reading process, wherein the method comprises:
   during the writing process, updating a first storage system with a write operation, processing, via an atomic operation, first data to be unreadable in a second storage system, and generating or updating, in the atomic operation, a version number corresponding to a first primary key so that the version number is pre-occupied in the second storage system, wherein the first data is data, in a second storage system, corresponding to the first primary key for the write operation;
   during the reading process, determining whether the first data is able to be read, with a read operation, from the second storage system;
   if it is determined that the first data is unable to be read, with the read operation, from the second storage system, acquiring a latest version number of the first primary key, and reading second data from the first storage system, wherein the second data is data, in the first storage system, corresponding to the first primary key;
   comparing the acquired version number with the latest version number of the first primary key which is pre-occupied in the second storage system;
   if the acquired version number is consistent with the latest version number of the first primary key which is pre-occupied in the second storage system, updating, via the atomic operation, the second data into the second storage system, and updating, in the atomic operation, the version number corresponding to the first primary key; and
   if the acquired version number is inconsistent with the latest version number of the first primary key which is pre-occupied in the second storage system, re-performing the step of acquiring the latest version number of the first primary key and reading the second data from the first storage system.

2. The method of claim 1, wherein the first storage system is a persistent data source and the second storage system is a cache system.

3. The method of claim 1, further comprising:
   if the latest version number of the first primary key is unable to be acquired, generating, via the atomic operation, an initial value of the version number corresponding to the first primary key.

4. The method of claim 1, wherein if it is determined that the first data is unable to be read, with the read operation, from the second storage system, acquiring the latest version number of the first primary key, comprises:
   sending, to the second storage system, a request for reading, with the read operation, data;
   receiving a message, indicating that the data is unreadable, fed back by the second storage system in response to the request, wherein the message carries the latest version number of the first primary key; and
   acquiring the latest version number of the first primary key according to the message.

5. The method of claim 1, wherein the second storage system provides a hidden acquisition interface, and the hidden acquisition interface is configured for acquiring the latest version number of the first primary key;
   wherein if it is determined that the first data is unable to be read, with the read operation, from the second storage system, acquiring the latest version number of the first primary key, comprises:
   sending, to the second storage system, a request for reading, with the read operation, data;
   receiving a message, indicating that the data is unreadable, fed back by the second storage system in response to the request; and
   acquiring, through the hidden acquisition interface of the second storage system, the latest version number of the first primary key according to the message.

6. The method of claim 1, wherein the second storage system provides a hidden interface, and the hidden interface is configured for marking, via the atomic operation, data as hidden to make the data unreadable, and generating or updating, in the atomic operation, a version number corresponding to a primary key for the data;
   wherein during the writing process, updating the first storage system with the write operation, processing, via the atomic operation, the first data to be unreadable in the second storage system, and generating or updating, in the atomic operation, the version number corresponding to the first primary key, comprises:
   during the writing process, updating the first storage system with the write operation, marking, via the atomic operation, the first data as hidden to make the first data unreadable by calling the hidden interface, and generating or updating, in the atomic operation, the version number corresponding to the first primary key.

7. The method of claim 1, wherein during the writing process, updating the first storage system with the write operation, processing, via the atomic operation, the first data to be unreadable in the second storage system, comprises:

during the writing process, updating the first storage system with the write operation, deleting, via the atomic operation, the first data, in the second storage system, corresponding to the first primary key for the write operation.

8. A computing device, comprising:
a memory and a processor;
wherein the memory is configured for storing computer executable instructions, and the processor is configured for executing the computer executable instructions to perform operations of:
during a writing process, updating a first storage system with a write operation, processing, via an atomic operation, first data to be unreadable in a second storage system, and generating or updating, in the atomic operation, a version number corresponding to a first primary key so that the version number is pre-occupied in the second storage system, wherein the first data is data, in a second storage system, corresponding to the first primary key for the write operation;
during a reading process, determining whether the first data is able to be read, with a read operation, from the second storage system;
if it is determined that the first data is unable to be read, with the a read operation, from the second storage system, acquiring a latest version number of the first primary key, and reading second data from the first storage system, wherein the second data is data, in the first storage system, corresponding to the first primary key;
comparing the acquired version number with the latest version number of the first primary key which is pre-occupied in the second storage system;
if the acquired version number is consistent with the latest version number of the first primary key which is pre-occupied in the second storage system, updating, via the atomic operation, the second data into the second storage system, and updating, in the atomic operation, the version number corresponding to the first primary key; and
if the acquired version number is inconsistent with the latest version number of the first primary key which is pre-occupied in the second storage system, re-performing the step of acquiring the latest version number of the first primary key and reading the second data from the first storage system.

9. A non-transitory computer readable storage medium, storing computer instructions, wherein the computer instructions, when executed by a processor, implement steps of:
during a writing process, updating a first storage system with a write operation, processing, via an atomic operation, first data to be unreadable in a second storage system, and generating or updating, in the atomic operation, a version number corresponding to a first primary key so that the version number is pre-occupied in the second storage system, wherein the first data is data, in a second storage system, corresponding to the first primary key for the write operation;
during a reading process, determining whether the first data is able to be read, with a read operation, from the second storage system;
if it is determined that the first data is unable to be read, with the read operation, from the second system, acquiring a latest version number of the first primary key, and reading second data from the first storage system, wherein the second data is data, in the first storage system, corresponding to the first primary key;
comparing the acquired version number with the latest version number of the first primary key which is pre-occupied in the second storage system;
if the acquired version number is consistent with the latest version number of the first primary key which is pre-occupied in the second storage system, updating, via the atomic operation, the second data into the second storage system, and updating, in the atomic operation, the version number corresponding to the first primary key; and
if the acquired version number is inconsistent with the latest version number of the first primary key which is pre-occupied in the second storage system, re-performing the step of acquiring the latest version number of the first primary key and reading the second data from the first storage system.

10. The computing device of claim 8, wherein the first storage system is a persistent data source and the second storage system is a cache system.

11. The computing device of claim 8, wherein the processor is configured for executing the computer executable instructions to further perform an operation of:
if the latest version number of the first primary key is unable to be acquired, generating, via the atomic operation, an initial value of the version number corresponding to the first primary key.

12. The computing device of claim 8, wherein if it is determined that the first data is unable to be read, with the read operation, from the second storage system, acquiring the latest version number of the first primary key, comprises:
sending, to the second storage system, a request for reading, with the read operation, data;
receiving a message, indicating that the data is unreadable, fed back by the second storage system in response to the request, wherein the message carries the latest version number of the first primary key; and
acquiring the latest version number of the first primary key according to the message.

13. The computing device of claim 8, wherein the second storage system provides a hidden acquisition interface, and the hidden acquisition interface is configured for acquiring the latest version number of the first primary key;
wherein if it is determined that the first data is unable to be read, with the read operation, from the second storage system, acquiring the latest version number of the first primary key, comprises:
sending, to the second storage system, a request for reading, with the read operation, data;
receiving a message, indicating that the data is unreadable, fed back by the second storage system in response to the request; and
acquiring, through the hidden acquisition interface of the second storage system, the latest version number of the first primary key according to the message.

14. The computing device of claim 8, wherein the second storage system provides a hidden interface, and the hidden interface is configured for marking, via the atomic operation, data as hidden to make the data unreadable, and generating or updating, in the atomic operation, a version number corresponding to a primary key for the data;
wherein during the writing process, updating the first storage system with the write operation, processing, via the atomic operation, the first data to be unreadable in the second storage system, and generating or updating, in the atomic operation, the version number corresponding to the first primary key, comprises:

during the writing process, updating the first storage system with the write operation, marking, via the atomic operation, the first data as hidden to make the first data unreadable by calling the hidden interface, and generating or updating, in the atomic operation, the version number corresponding to the first primary key.

15. The computing device of claim 8, wherein during the writing process, updating the first storage system with the write operation, processing, via the atomic operation, the first data to be unreadable in the second storage system, comprises:

during the writing process, updating the first storage system with the write operation, deleting, via the atomic operation, the first data, in the second storage system, corresponding to the first primary key for the write operation.

16. The computer readable storage medium of claim 9, wherein the first storage system is a persistent data source and the second storage system is a cache system.

17. The computer readable storage medium of claim 9, wherein the computer instructions, when executed by a processor, further implement a step of:

if the latest version number of the first primary key is unable to be acquired, generating, via the atomic operation, an initial value of the version number corresponding to the first primary key.

18. The computer readable storage medium of claim 9, wherein if it is determined that the first data is unable to be read, with the read operation, from the second storage system, acquiring the latest version number of the first primary key, comprises:

sending, to the second storage system, a request for reading, with the read operation, data;

receiving a message, indicating that the data is unreadable, fed back by the second storage system in response to the request, wherein the message carries the latest version number of the first primary key; and acquiring the latest version number of the first primary key according to the message.

19. The computer readable storage medium of claim 9, wherein the second storage system provides a hidden acquisition interface, and the hidden acquisition interface is configured for acquiring the latest version number of the first primary key;

wherein if it is determined that the first data is unable to be read, with the read operation, from the second storage system, acquiring the latest version number of the first primary key, comprises:

sending, to the second storage system, a request for reading, with the read operation, data;

receiving a message, indicating that the data is unreadable, fed back by the second storage system in response to the request; and acquiring, through the hidden acquisition interface of the second storage system, the latest version number of the first primary key according to the message.

20. The computer readable storage medium of claim 9, wherein the second storage system provides a hidden interface, and the hidden interface is configured for marking, via the atomic operation, data as hidden to make the data unreadable, and generating or updating, in the atomic operation, a version number corresponding to a primary key for the data;

wherein during the writing process, updating the first storage system with the write operation, processing, via the atomic operation, the first data to be unreadable in the second storage system, and generating or updating, in the atomic operation, the version number corresponding to the first primary key, comprises:

during the writing process, updating the first storage system with the write operation, marking, via the atomic operation, the first data as hidden to make the first data unreadable by calling the hidden interface, and generating or updating, in the atomic operation, the version number corresponding to the first primary key.

* * * * *